UNITED STATES PATENT OFFICE.

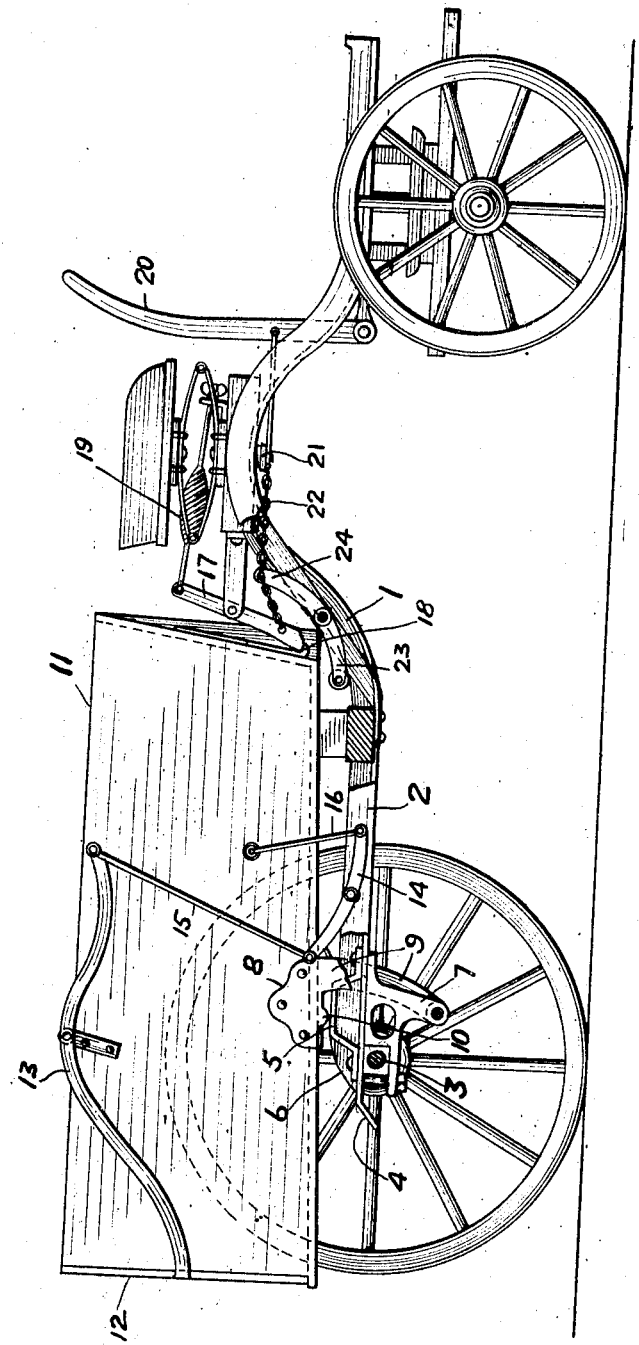

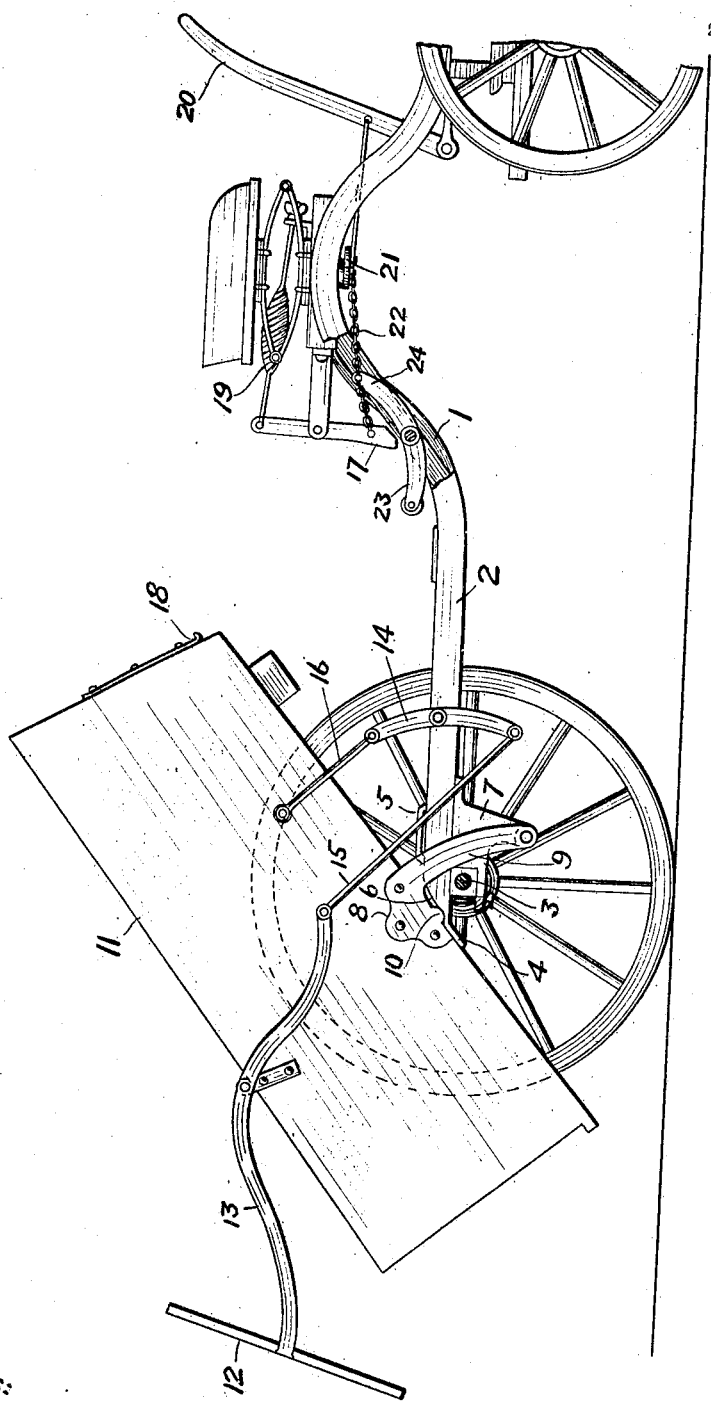

HENRY PEZZETTI, OF PHILADELPHIA, PENNSYLVANIA.

WAGON.

1,084,358. Specification of Letters Patent. Patented Jan. 13, 1914.

Application filed July 20, 1911. Serial No. 639,541.

*To all whom it may concern:*

Be it known that I, HENRY PEZZETTI, a subject of the King of Italy, but having declared my intention of becoming a citizen of the United States, and residing at Philadelphia, in the county of Philadelphia and State of Pennsylvania, United States of America, have invented certain new and useful Improvements in Wagons, of which the following is a specification.

Objects of the present invention are to provide a dump wagon or cart in which the center of gravity of the load shall be in front of the rear axle so that the wagon, more particularly the front wheels, will remain firmly on the ground and will not tend to rise or skid; to provide for limiting the range of dumping motion of the body so that the end thereof will strike the ground in such a way that none of the parts are unduly strained or jarred; to provide simple and efficient means whereby when the wagon is dumped the tail-board assumes such position that the center of gravity is so shifted that the body automatically returns to normal position; to provide mechanism operated by a single handle and which by a single movement of the handle first releases the body and then gives it an initial dumping movement; and to provide pivotal connections and their accessories by which the center of gravity is shifted from in front to behind the rear axle during the dumping operation.

The improvements are applicable not only to motor trucks, but also to horse drawn carts and wagons, and their application to the latter has been selected for the sake of description and has been illustrated in the accompanying drawings, in which—

Figure 1, is a side view, partly in section of a wagon embodying features of the invention and showing the body in normal position. Fig. 2 is a similar view showing the body in dumping position and about to return automatically to normal position.

In the drawings 1 and 2, are side rails and they may be the reaches of the wagon, as shown, or they may be shafts or the side bars of the frame or chassis of a motor truck. They are shown to consist of angle-irons.

3, is an axle secured to the side rails.

4, is an inclined stop in rear of the axle.

5, is a support in front of the axle and 6, is a segment between the stop and support.

7, is a pivot bracket having a pivot concentric with the segment and in front of the axle and below the rail.

All of the parts last described are carried by the rail and are present in duplicate, one set for each rail. These parts may be variously constructed and one way of constructing them is clearly shown in the drawings.

8, is a fitting having arms pivoted to the brackets 7 and arranged to coöperate with the support 4 and segment 6. As shown the fitting 8 has a pair of arms 9 which straddle the rail and are pivotally connected on each side of the bracket 7. The fitting 8 is also shown as having a projection 10 which slides on the segment 6 and coöperates with the stop 4 and the support 5. The body 11 is attached to the fittings 8 and is therefore pivotally supported.

Evidently the center of gravity, when the body is in normal position, is in front of the axle 3 (Fig. 1), whereas when the body is in dumped position, as shown in Fig. 2, the center of gravity of the body, without regard to the tail-board 12, is in rear of the axle and the movement of the body is limited by the stops as shown.

13, is an arm pivoted intermediate of its ends to the body and 14 is an arm pivoted intermediate of its ends to the rails; the adjacent ends of these arms are connected by a link 15 and the tail-board 12 is attached to the ends of the arms 13. Links 16 connect the ends of the arms 14 with the body. The effect of these connections is that after the load is dumped the weight of the tail-board operating through the connections may be availed of for automatically returning the body to its normal position.

17, is a latch which normally engages a projection 18 on the body and locks it against dumping. The latch 17 is shown as pivoted at its middle part and having a spring 19 connected with one of its ends. There is a hand lever 20 shown as connected to one end of a bar 21, the other end of which is pivoted. The intermediate part of the bar 21 is connected by a chain 22 with the latch 17 and with one end 24 of a centrally pivoted crank arm, the other end 23 of which operates to start the body to dump.

The connections to the chain are such that the latch 17 is released before the arm 23 becomes effective and both of these parts are operated by a single movement of the hand lever 20.

What I claim is:

The combination in a dumping wagon, of rails, a pivotal body, two sets of arms whereof one is pivoted intermediate of its ends to the body and whereof the other is pivoted intermediate of its ends to the rails, a link connecting the adjacent ends of said arms, a tail-board connected to the free ends of said first mentioned arms, and a link connected to the end of the other arm and to the body.

In testimony whereof I have hereunto signed my name.

HENRY PEZZETTI.

Witnesses:
CLIFFORD K. CASSEL,
K. M. GILLIGAN.